Sept. 2, 1969          G. J. BROUWER          3,464,641
                      SOD ROLLING APPARATUS
Filed June 19, 1967                          3 Sheets-Sheet 1

*INVENTOR.*
GERARDUS JOHANNES BROUWER

BY *Rogers, Bereskin, & Parr*

Sept. 2, 1969        G. J. BROUWER        3,464,641

SOD ROLLING APPARATUS

Filed June 19, 1967        3 Sheets-Sheet 2

*INVENTOR.*
GERARDUS JOHANNES BROUWER

BY *Rogers, Bereskin, & Parr*

*INVENTOR.*
GERARDUS JOHANNES BROUWER

BY *Rogers, Bereskin, & Parr*

United States Patent Office 3,464,641
Patented Sept. 2, 1969

3,464,641
SOD ROLLING APPARATUS
Gerardus Johannes Brouwer, R.R. 1, Keswick,
Ontario, Canada
Filed June 19, 1967, Ser. No. 646,873
Claims priority, application Canada, May 13, 1967,
990,435
Int. Cl. B65h 75/02, 17/02
U.S. Cl. 242—55                                    12 Claims

ABSTRACT OF THE DISCLOSURE

Apparatus for rolling up a sod strip travelling along a conveyor, wherein a tray having an up-curved front end is mounted just above the conveyor, for movement upwardly away from and downwardly towards the conveyor. When the front of a sod strip strikes the curved end of the tray, a turn forms in the sod. The turned end of the sod then moves under the tray, rolling as it progresses, and forcing the tray upwardly. After the rolled end emerges from the tray, the rolling is completed by a powered elevator, or by the sod rolling downhill against a roller.

---

This invention relates to apparatus for starting a turn in a strip of sod travelling along a conveyor. The invention further relates to apparatus for rolling up a strip of sod once the end of the strip has been turned.

In the past, various attempts have been made to roll up strips of sod travelling along a conveyor. The prior art equipment was typically complicated and costly and often failed to roll the sod strips rapidly and without serious danger of breakage. Typical examples of rather complex prior art equipment are shown in U.S. Patents 2,617,347 and 2,756,661.

Accordingly, it is an object of the present invention to provide improved apparatus for starting a turn in a strip of sod advancing along a conveyor, which apparatus is simple, relatively inexpensive, and efficient in operation. In a typical embodiment of the invention this is achieved by positioning tray adjacent the conveyor with the front end of the tray extending transverse to the direction of movement of the conveyor. The tray is supported for movement upwardly away from the conveyor and downwardly toward the conveyor, and includes a front camming portion slanting forwardly and upwardly from the conveyor. When the front end of a sod strip strikes this front camming portion, the sod is turned back on itself. i.e. an initial turn is formed in the front end of the sod strip.

As the turn is formed, the tray begins to rise, so that the rolled end of the sod strip then forces its way under the blocking means and travels under the same, rolling as it progresses. In a preferred embodiment of the invention, means are provided to bias the tray downwardly, to tighten the rolled end of the sod strip as it passes thereunder. After the rolled end of the sod strip has passed under the tray, other means may be provided to roll up the sod strip into a completed roll.

Further objects and advantages of the invention will appear from the following disclosure, taken together with the accompanying drawings, in which:

FIG. 10 is a perspective view of another embodiment of the invention.

Figure 1:
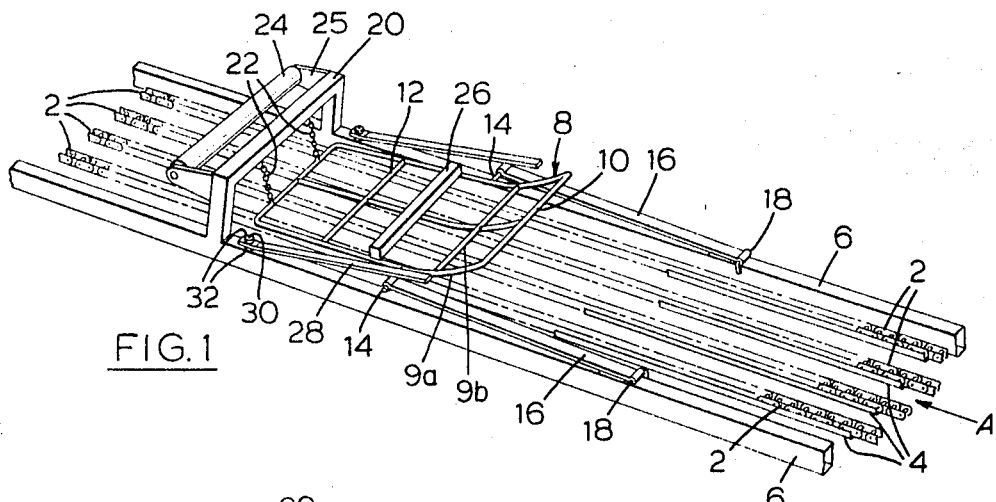
FIG. 1 is a perspective view of a portion of a chain conveyor including sod rolling apparatus according to the invention.
Figure 2:
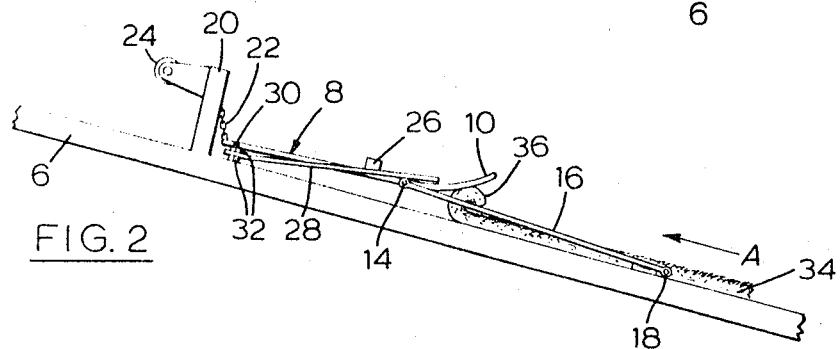
FIG. 2 is a side view of the apparatus of FIGURE 1 showing the commencement of the sod rolling process.
Figure 3:
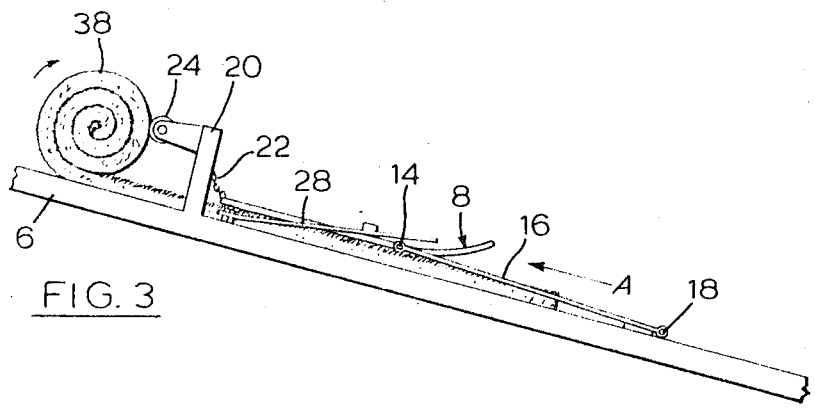
FIG. 3 is a side view similar to FIG. 2 but showing the sod rolling process at a time when a sod roll has been nearly completely rolled.

Referring firstly to FIGURES 1 to 3, there is shown a portion of a chain conveyor having a set of conveyor chains 2 travelling in the direction of arrow A. The chains are shown as four in number but, depending on the width of the sod to be cut, five or more may be used.

The apparatus of FIG. 1 includes support means for the conveyor chains 2, namely, chain guides 4 for the chains, and side frame members 6 to which the chain guides are attached (by cross members not shown).

The conveyor will normally be inclined upwardly at an angle (e.g., 20–30 degrees) and will typically be part of a sod cutting machine such as that described in my co-pending patent application Ser. No. 560,770 filed June 27, 1966. In such sod cutting machine, sod is cut into strips of discrete length and fed onto an upwardly sloping conveyor as the machine travels forward. Normally the speed of the conveyor will be slightly faster than the speed of forward travel of the machine, so that the ends of adjacent sod strips advancing up the conveyor will be spaced apart.

Supported just above the conveyor is the device previously referred to as the blocking means. In the FIGS. 1 to 3 embodiment this takes the form of a single tray 8 formed of spaced parallel small diameter metal rods 9a extending parallel to the direction of movement of the conveyor, and transverse rods 9b connecting the rods 9a. The tray 8 has an upwardly curved front camming portion 10 (convex as viewed from the front) and a flat rear portion 12. The tray 8 is supported at a position approximately at the rear of the front camming portion 10 by a pair of shafts 14 extending from the sides of the tray and pivotally connected to a pair of links 16. The links 16 extend frontwardly from the shaft 14 and are pivotally connected at 18 to the side frame members 6. The result of this arrangement is that the tray is held fairly rigidly against sideways movement relative to the conveyor, but the tray is permitted to move upwardly away from and downwardly towards the conveyor. In rest position (when no sod is present) the links 16 hold the front part of the tray 8 just above the conveyor chains 2.

Just behind the tray 8, the conveyor is provided with an inverted U shaped cross member 20 which straddles and is connected to the side frame members 6. The back part of the tray 8 is supported loosely just above the conveyor chains 2 by a pair of chains 22 connected to the cross member 20. A roller 24 is rotatably mounted on a pair of support arms 25 extending rearwardly from the cross member 20. The roller is adjustable up and down, by means not shown.

The tray 8 is biased downwardly by a weight 26 and may be further biased downwardly by a pair of spring metal strips 28 supported (by bolts 30) in a position to urge the shafts 14 downwardly. The free ends of the strips 28 may be raised slightly above the shafts 14 by a double nut arrangement 32 on the bolts 30, so that the shafts 14 do not engage the free ends of the strips 28 until the front end of the tray 8 has been raised slightly.

The operation of the device just described is as follows. When the front end of a strip of sod 34 (FIG. 2) travelling up the conveyor strikes the curved front end of the tray 8, a turn 36 is formed at the front end of the sod strip. It is believed that the reason for the formation of this turn is probably because the top surface of the front end of the sod strip 34 strikes the undersurface of the tray 8 and is retarded in its motion along the conveyor, while the bottom surface of the sod strip is carried along at full speed, with the result that the end of the sod strip is turned. The end of the sod strip 34 is of course quite stiff and resists turning, but the undersurface of the tray 8 is extremely irregular by virtue of its construction from rods 9a, 9b, and the end of the sod strip is forced to turn when it engages one of the transverse rods 9b. The rods 9a, 9b define a series of openings between them, and this open construction prevents clogging and smoothing of the undersurface of the tray 8 by dirt from the sod.

As this turn in the front end of the sod strip is formed and advances along the conveyor, the front end of the tray 8 is forced upwardly and the turned or rolled end 36 is carried along under the tray, rolling as it progresses. Because the tray 8 is relatively short (typically 13 to 15 inches), only a few turns are formed as the rolled end 36 progresses under the tray. The purpose of the weight 26 on the tray is to tighten the turns formed under the tray, so that a roll of sod with a tight core will be produced. However, the weight 26 should not be too great, or the front end of the tray 8 will fail to rise when it is struck by the front end of a sod strip. In such event the sod will simply slide down the conveyor instead of passing under the tray and being rolled up, a highly undesirable occurrence. The tolerances here are quite large, and it is found that depending on the thickness and condition of the sod being cut, and on the weight of the tray, no weight at 26 at all may be needed. The combined weight of the tray and weight 26 will usually lie between about one and fifteen pounds.

The curved front portion of the tray 8 facilitates entry of the sod strip under the tray without buckling of the sod, and provides in effect a camming surface against which the turned end of the sod strip may push to raise the tray so that the sod can pass thereunder. (Substantially the same results would be achieved by forming the front portion of the tray as a straight but upslanting surface, joining the main part of the tray at an angle.)

The spring strips 28, which are optional, provide additional tightening pressure after the initial turn 36 in the sod strip has been formed and begins to move under the tray 8. As the front end of the tray rises, the shafts 14 move against the spring strips 28, which then bring additional downward pressure to bear on the tray, tightening the turns formed under the tray. As the turned end of the sod strip advances under the tray, the rear portion 12 of the tray rises (this being permitted by virtue of chains 20), and the front camming portion falls toward the conveyor chains, in preparation for starting a new sod roll from the next sod strip.

After the rolled end of the strip emerges from under the rear portion 12 of the tray, the rolled end is propelled briefly along the conveyor without further rolling, because of the stiffness of the sod. The distance that the rolled end will travel from the rear end of the tray 8 before it begins to roll back downhill depends on the slope and speed of the conveyor and the nature of the sod, and can be varied by adjusting the conveyor slope and speed. When the rolled end begins to roll downhill, it increases slightly in diameter so that when it reaches roller 24, it is too large to pass thereunder. The sod strip then proceeds to roll itself up against the roller 24. This situation is shown in FIGURE 3, where an almost completely formed roll 38 of sod is shown. After the roll 38 has been completely formed, it is removed by an operator who will typically be riding on the back of the machine.

After the trailing edge of sod strip 34 passes under the front portion of the tray 8, there will be a short time interval until the front end of the next sod strip arrives at the tray, since the ends of adjacent sod strips are spaced apart, as mentioned. The spacing permits the front portion of the tray 8 to return to rest position after the trailing end of strip 34 passes, so that it will be in position to turn the front end of the next sod strip.

Figure 4:
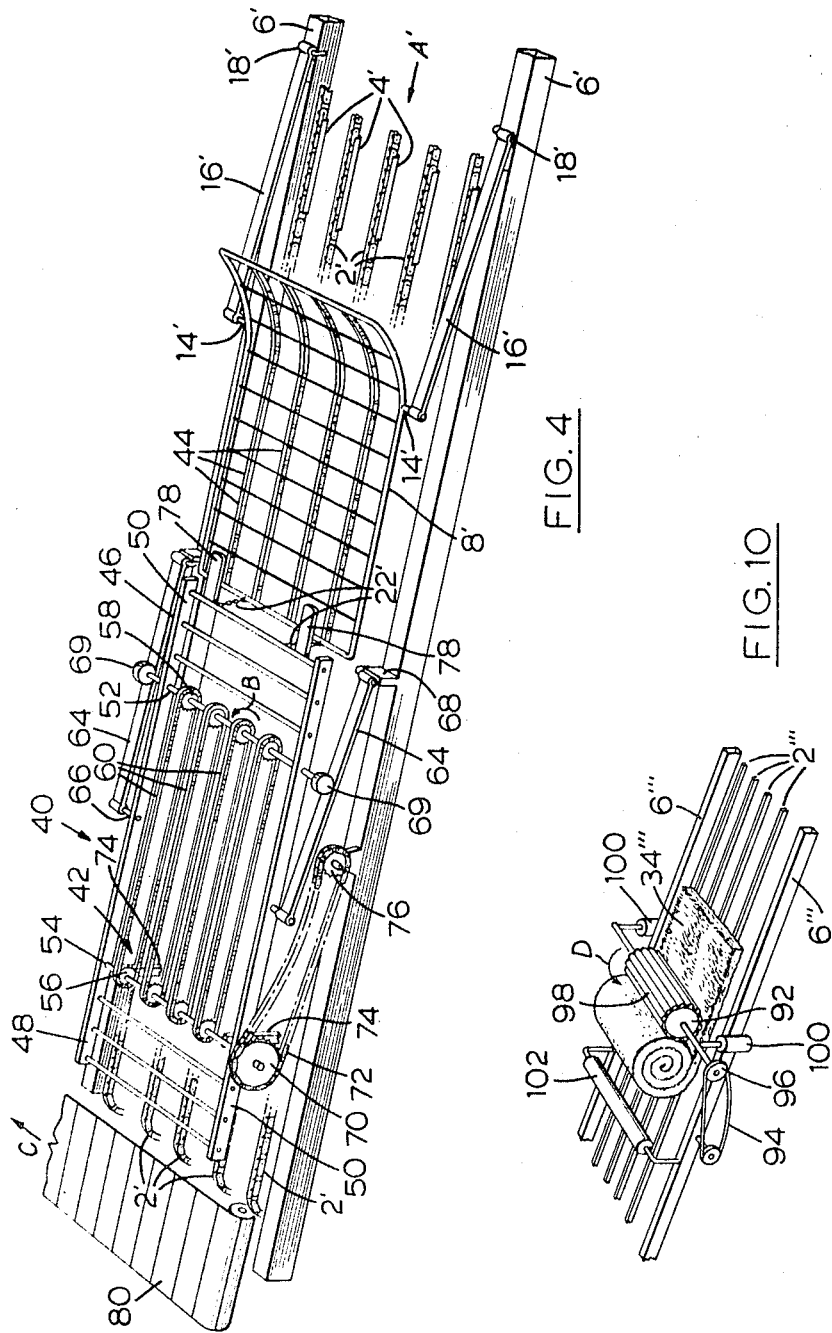
FIG. 4 is a perspective view showing another embodiment of the invention.
Figure 5:
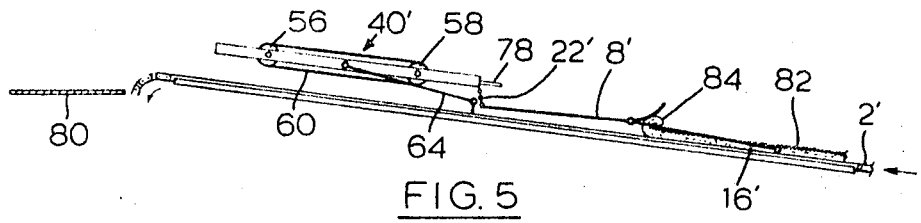
FIGS. 5 to 8 are diagrammatic views illustrating steps in the progress of a sod strip through the apparatus of FIG. 4.
Figure 6:
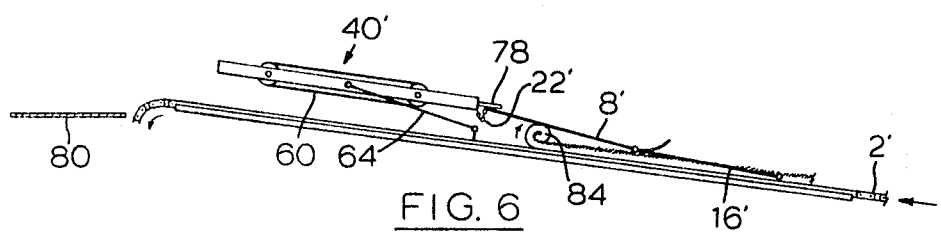

If desired, instead of using the roller arrangement of FIG. 1 to roll up sod once it has emerged from beneath the tray, the rollup arrangement of FIG. 4 may be used. The advantage of the FIG. 4 arrangement is that it rolls sod more tightly than does the roller of FIG. 1, and the rolled sod may conveniently be ejected automatically onto a further conveyor without assistance from an operator.

In the FIG. 4 arrangement, where primed reference numerals indicate corresponding parts, there is provided a tray 8', and a roll-up device 40 including a powered roll-up elevator 42, mounted behind the tray 8'.

The tray 8' is of heavier construction than the tray 8 of FIG. 1 and includes a set of chains 44 welded to its lower surface. The chains 44, which are located between the conveyor chains 2' as viewed from above, are provided to increase the friction between the upper surface of the rolled end of the sod strip and the lower surface of the tray as the turned end progresses thereunder. This maximizes the amount of rolling that occurs beneath the tray since it reduces slippage, and is thus useful for timing reasons that will be discussed presently. Because of the weight of the tray, no further weight such as weight 26 is needed. (However, a tray such as the tray 8 of FIG. 1 can be used if desired.)

The roll-up device 40 includes front and rear flat portions 46, 48 formed simply by a ladder arrangement of metal bar crosspieces fixed between a pair of longitudinal frame members 50, as shown. The rollup elevator 42 is located between the front and rear portions 46, 48 and includes front and rear shafts 52, 54 journalled in the frame members 50. Driver sprockets 56 are fixed to the rear shaft 54, while idler sprockets 58 are rotatably mounted on the front shaft 52, the respective sprockets being located between the conveyor drive chains 2' as viewed from above. Rollup chains 60 extend between the sprockets to form the usual lower and upper runs.

The rollup device 40 is supported by a pair of links 64, which are pivotally connected to a pair of shafts 66 projecting from the side frame members 50 at a position approximately midway along the length of the rollup device. The links 64 are pivotally connected to a pair of supports 68 mounted on the side frame members 6' of the conveyor, thus providing a support arrangement much like that for the tray 6'.

The front part of the rollup device is held above the conveyor chains 2' by projections 69 on the front idler shaft 52. These projections rest on the links 66 when the rollup device is in rest position. The rear part of the rollup device is slightly heavier than the front part, because of the weight of a large drive sprocket 70 and a drive chain 72, so the rear part of the rollup device is supported by stop posts 74 fixed (by means not shown) to the side frame members 6'. (Similar stop posts may be used in place of the projections 69 to support the front part of the rollup device.) At rest the equipment assumes the position shown in FIG. 4. In operation, the link mounting arrangement permits up and down movement of the rollup device 40, and also permits front to back rocking movement (as the rolled end of a sod strip progresses under the rollup device), while holding the rollup device fairly rigidly against side to side movement.

The rear part of the tray 8' is held just above the conveyor chains 2' by a pair of chains 22' supported from the front portion 46 of the roll device. In addition, the front portion of the rollup device includes a pair of projections 78 which extend over the rear of the tray 8' so that when the rear part of the tray rises, the front part of the rollup device will rise with it.

Finally, rolled sod emerging from the rollup device falls onto a side conveyor 80 which moves in the direction of arrow C to convey the sod to any desired location.

The operation of the apparatus of FIG. 4 is as follows, with reference to FIGS. 5 to 8. When the front end of a sod strip 82 strikes the front camming portion of the tray 8', the end of the sod strip is rolled (as shown at 84, FIG. 5), as in the FIG. 1 embodiment.

As the rolled end 84 progresses under the tray, it lifts the rear portion of the tray upwardly (FIG. 6), thus beginning to lift the rollup device 40. Because of the location of the rear part of the tray 8' beneath the projections 78, the rolled end 84 will progress smoothly from beneath the tray to beneath the rollup device.

Figure 7:
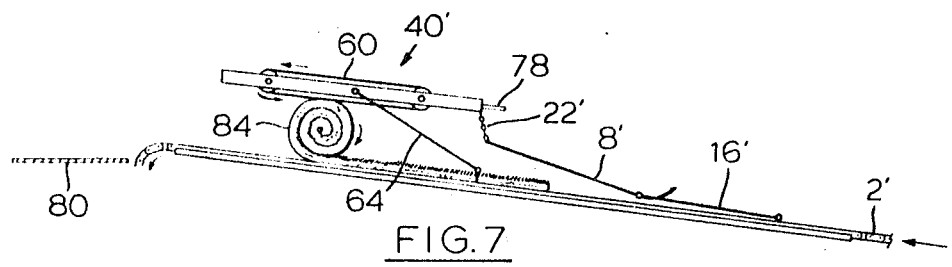

When the rolled end 84 moves under the rollup elevator, its advance up the conveyor is slowed (because of the movement of the elevator) and the rolling rate per unit of advance of the rolled end along the conveyor is increased. The rollup elevator will be driven at a lower speed than the main conveyor chains to permit continued advance of the rolled end. The diameter of the rolled end 84 now rapidly increases, as shown in FIG. 7. At this stage the rear end of the tray 8' is held in a somewhat elevated position by the chains 22', but the front end of the tray rests adjacent the conveyor.

Figure 8:
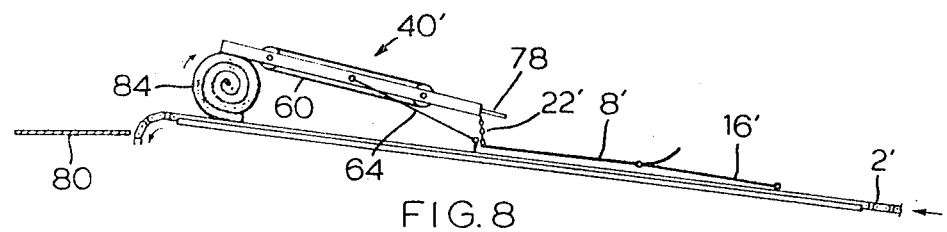

Finally, as shown in FIG. 8, the sod strip emerges entirely rolled from the rollup device 40. In FIG. 8, the rear position of the rollup device is still in a partly elevated position, but the chains 22' have permitted the rear portion of the tray 8' to return to rest position, so that the tray is ready to start a new sod strip. In practice the tray 8' will usually be starting a new sod strip while a rolled strip is emerging from the rollup device 40.

Figure 9A:
FIGS. 9a and 9b show two possible orientations for a sod roll emerging from the apparatus of FIG. 4.
Figure 9B:

After the rolled sod emerges from the rollup device 40, it may, in one embodiment of the present invention, drop onto the conveyor 80 for transportation in a direction transverse to the direction of advance of conveyor chains 6. When conveyor 80 is provided, it is preferred that the rolled sod, when it reaches conveyor 80, be in the orientation shown for roll 84a in FIG. 9a, and not in the orientation shown for roll 84b in FIG. 9b, in which an end 90 has become unrolled. The orientation in which the sod roll emerges from the rollup device can be controlled by varying the speed and length of the rollup elevator, and the length of the tray 8', but it is important that rolling of the sod commence at the same position along the tray for each sod strip, and that the same amount of slippage occur for each sod strip, so that the results will be reproducible. This is the timing referred to previously. Of course, if no side conveyor 80 is used, e.g., if the sod rolls are removed immediately by an operator upon their completion, then the orientation of the roll when it emerges from under the rollup device is immaterial.

If desired, the rollup elevator 42 can be eliminated, the rollup device then comprising simply a flat framework somewhat like the tray 8' but without an upwardly curved front end. The difficulty with this arrangement is that unless the sod strips are very short, they will not entirely roll up by the time they have passed under the rollup device, unless the rollup device is made very long. However, if the rollup device is made too long, then the front of the rollup device and hence the tray 8' will not return in time to a position in which the tray can turn the end of another sod strip unless the ends of successive sod strips are spaced excessively far apart. Wide spacing of successive sod strips can usually only be achieved when the sod harvesting machine (not shown) of which the present apparatus typically forms a pair is travelling slowly relative to the conveyor speed, thus reducing the harvesting rate, and this is undesirable.

Therefore, if the rollup elevator is to be eliminated, then preferably two, or even three, rollup devices such as that shown in FIG. 4 (without the rollup elevator) will be provided. A typical length for each is about 30 inches. Each will have its own link mounting arrangement, and the front of each will project over the rear of its neighbour, in the same way that the front of rollup device 40 projects over the rear of tray 8'. The tray 8' will also be provided, to start the roll.

It will be apparent that since gravity is not being employed in the FIG. 4 arrangement to roll up the sod, there is no need for the conveyor chains 2 to advance upwardly, and the conveyor can be run on the level if desired.

If desired, the tray 8' of the FIG. 4 arrangement could be eliminated. In that case, the front portion of the rollup device 40 would be upturned, to turn the end of an advancing sod strip, and would be held closer to the conveyor chains by the links 64. Alternatively, the front portion 46 of the rollup device could also be eliminated, since the sprockets 52 and chains thereon will act as camming surfaces to turn the end of a sod strip. In fact, since the lower run of the chains 60 will inevitably sag and hence will be upslanting near the sprockets, the front part of the lower run may be used to turn the end of a sod strip.

The disadvantage of using a single unit (such as the rollup device 40) to roll sod, as opposed to an articulated unit such as the tray and rollup device combined, is that if a single unit is used, then it must finish one roll of sod before it can start a new sod strip. With an articulated unit, the rear section can be completing the rolling of one strip while the front section is starting a new strip. Therefore, with an articulated section, the gap between the ends of successive sod strips can be reduced, increasing the speed of processing.

It will be evident that when a powered rollup elevator is used, the elevator need not include elevator chains. If desired, a belt, e.g., of mesh, can be used, or a rod elevator can be used. In addition, although a chain drive has been shown, a belt drive could be used (with a spring mounted idler to maintain belt tension), or any other appropriate drive, such as an oil motor, could be employed.

A further modification of the invention is shown in FIGURE 10, where triple primed reference numerals indicate parts corresponding to those of FIG. 1. In the FIGURE 10 embodiment, instead of a powered roll-up elevator, a powered roll-up drum 92 is employed, driven in the direction of arrow D by means such as a drive chain 94 driving a sprocket 96. The drum 92 has a roughened surface which may conveniently be obtained by welding strips of chain 98 thereto, either across the drum as shown or circumferentially if desired. The drum is supported just above the conveyor chains 2''' by a spring mounting 100, so that as a strip of sod advancing up the conveyor strikes the drum 92, the drum will rise upwardly, forming a turned end in the sod and permitting the turned end to pass under the drum. After the turned end has passed under the drum, the drum moves slightly downwardly by virtue of the spring mounting, preventing the turned end of the sod from rolling downhill down the conveyor. Rotation of the drum in the direction of arrow D then rapidly rolls up the sod strip as it is advanced by the conveyor. An idler roller 102 supported rearwardly of the drum 92 prevents any tendency of the rolling sod to jump off the conveyor.

In the embodiments illustrated in FIGS. 1 to 4, there will normally be a pair of low guide walls (not shown), formed of metal stripping, extending along and above the inside edges of the frame members 6, 6'. These guide walls assist in maintaining the sod aligned on the conveyor, and also may serve as supports for the shafts 14, to hold the front end of the tray 8, 8' above the conveyor chains.

What I claim as my invention is:

1. Apparatus for starting a turn in the end of a strip of sod advancing from a forward position toward a rearward position along a conveyor, said apparatus comprising:
   (a) support means for said conveyor,
   (b) an elongated tray having a rear portion and a front camming portion slanting forwardly and upwardly from said rear portion,
   (c) mounting means supporting said tray adjacent and above said conveyor for movement upwardly away from and downwardly toward said conveyor, and for front to back rocking of said tray relative to said conveyor, said mounting means including means connected to said conveyor support means and bearing against said tray adjacent said front camming portion to constrain said front camming portion against side to side movement,
   (d) said tray having an irregular sod-engaging lower surface for engaging said sod, said lower surface having a plurality of openings therein to prevent clogging and smoothing of said lower surface by dirt from said sod, so that as said end of said sod strip strikes said front camming portion, a turn is formed at said end, movement of said conveyor thrusting such turned end against said camming portion to force said camming portion and thus the remainder of said tray upwardly, said mounting means permitting said tray to rise to allow said turned end to pass under said tray.

2. Apparatus according to claim 1 including means for exerting pressure additional to that provided by the weight of said tray for biasing said tray downwardly after it has been forced upwardly to a predetermined extent, said predetermined extent being such that said turned end of said sod strip is formed and begins to pass under said tray before said further pressure is exerted on said tray.

3. Apparatus according to claim 1 wherein said conveyor support means mounts said conveyor in a position sloping rearwardly upwardly, said apparatus including sod rollup means comprising
   (1) a roller
   (2) means rotatably mounting said roller across said conveyor just rearwardly of the rear portion of said tray and just above the height to which said sod will roll under said tray as it emerges from said tray, so that after said turned end of said rod strip emerges from said rear portion of said tray, said turned end rolls downhill against said roller and is then rolled up by continued advance of said conveyor.

4. Apparatus according to claim 1 wherein said means bearing against said front camming portion comprises a pair of links, one on each side of said tray, pivotally connected to said tray at a pivotal axis transverse to the direction of movement of said conveyor, and means pivotally connecting the front ends of said links to said conveyor support means at a position forward of said pivotal axis, said mounting means further including means connected to said conveyor support means for loosely supporting the rear portion of said tray just above said conveyor.

5. Apparatus according to claim 4 wherein said means for loosely supporting the rear of said tray above said conveyor comprises a support connected to said conveyor support means and extending above said rear portion of said tray, and flexible connecting means hanging the rear portion of said tray from said support.

6. Apparatus according to claim 1 including sod rolling means comprising:
   (1) elongated friction means having a sod engaging undersurface,
   (2) second mounting means pivotally mounting said friction means at the rear of said tray with said friction means extending rearwardly along said conveyor from said tray, for movement of said friction means upwardly away from and downwardly towards said conveyor and for front to back rocking movement of said friction means,
   (3) said friction means including a projection extending forwardly over the rear portion of said tray, so that as the rear portion of said tray rises, it engages said projection to cause said friction means to rise therewith, the rear end of said tray being free to fall towards said conveyor after the rolled end of said sod strip has emerged from thereunder and while said rolled end holds the front end of said friction means in a position elevated from said conveyor.

7. Apparatus according to claim 6 wherein said mounting means for said tray includes flexible hanging means hanging said rear portion of said tray from the front portion of said friction means.

8. Apparatus according to claim 7 wherein said friction means includes a powered rollup elevator, said elevator having an elongated endless elevating surface having a lower run and an upper run, said second mounting means supporting said elevating surface for travel of said lower run adjacent said conveyor and along said conveyor in a direction opposite to the direction of travel of said conveyor.

9. Apparatus according to claim 8 wherein said elevating surface of said rollup elevator comprises a set of driven chains, and said conveyor comprises a set of spaced conveying chains, said second mounting means holding said rollup elevator with said driven chains between said conveyor chains as viewed from above.

10. Apparatus according to claim 9 wherein said second mounting means comprises a second pair of links pivotally connected to said friction means at a position intermediate the ends of said friction means, means pivotally connecting said second pair of links to said conveyor support means at a position forwardly of the connection between said second pair of links and said friction means, and means connected to said conveyor support means for loosely supporting the rear end of said friction means just above said conveyor.

11. Apparatus for starting a turn in the end of a strip of sod advancing from a forward position towards a rearward position along a conveyor, said apparatus comprising
   (a) support means for said conveyor,
   (b) an elongated tray having a rear portion and a front camming portion slanting forwardly and upwardly from said rear portion, said tray comprising a first set of elongated structural members spaced apart and extending parallel to the direction of travel of said conveyor, and a second set of elongated structural members spaced apart and extending at right angles to said first set and connecting the structural members of said first set, said first and second sets of members defining for said tray an irregular lower surface having a plurality of openings therein, and
   (c) mounting means supporting said tray adjacent and above said conveyor for movement upwardly away from and downwardly towards said conveyor and for front to back rocking movement of said tray, said mounting means including means for constraining said front camming portion against side to side movement, so that as said end of said sod strip strikes said front camming portion, a turn is formed at said end, movement of said conveyor thrusting such turned end against said camming portion to force said camming portion and thus the remainder of said tray upwardly, said mounting means permitting said tray to rise to allow said turned end to pass under said tray.

12. Apparatus according to claim 11 wherein one of said sets of structural members is a set of chains, to increase the roughness of said lower surface of said tray.

References Cited

UNITED STATES PATENTS

| 2,939,645 | 6/1960 | Rowlands et al. | 242—56 |
| 3,235,011 | 2/1966 | Pasinski et al. | 172—19 |
| 3,314,627 | 4/1967 | Wetzler | 242—67.1 |
| 3,375,877 | 4/1968 | Pasinski et al. | 172—19 |

GEORGE F. MAUTZ, Primary Examiner

U.S. Cl. X.R.

172—19; 242—67.1